(12) United States Patent
Fukuda

(10) Patent No.: US 8,625,587 B2
(45) Date of Patent: Jan. 7, 2014

(54) TRANSMISSION SYSTEM AND TRANSMISSION APPARATUS

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 12/742,623

(22) PCT Filed: Oct. 20, 2008

(86) PCT No.: PCT/JP2008/068934
§ 371 (c)(1),
(2), (4) Date: May 12, 2010

(87) PCT Pub. No.: WO2009/069400
PCT Pub. Date: Jun. 4, 2009

(65) Prior Publication Data
US 2010/0254379 A1    Oct. 7, 2010

(30) Foreign Application Priority Data

Nov. 27, 2007    (JP) ................................. 2007-306637

(51) Int. Cl.
*H04L 12/28* (2006.01)
(52) U.S. Cl.
USPC ........................................................ 370/389
(58) Field of Classification Search
USPC .......................... 370/338, 345, 389, 449, 485
See application file for complete search history.

(56) References Cited

U.S. PATENT DOCUMENTS 7,321,619 B2 *  1/2008  Samueli et al. ............... 375/229
2006/0198389 A1  9/2006  Eriokson et al.

FOREIGN PATENT DOCUMENTS

| JP | 08-148359 | 6/1996 |
|---|---|---|
| JP | 63-229595 | 9/1998 |
| JP | 2000-224082 | 8/2000 |
| JP | 2002-016214 | 1/2002 |
| JP | 2002-261789 | 9/2002 |
| JP | 2006-050393 | 2/2006 |
| JP | 2006-246462 | 9/2006 |
| JP | 2007-036698 | 2/2007 |
| JP | 2007-206882 | 8/2007 |
| WO | 2006/067528 A2 | 6/2006 |
| WO | 2007/079501 A2 | 7/2007 |

OTHER PUBLICATIONS

International Search Report dated Nov. 10, 2008, for corresponding Patent Application No. PCT/JP2008/068934.
Japanese Office Action issued Mar. 27, 2012, for corresponding Japanese Appln. No. 2007-306637.
Japanese Office Action issued Jul. 24, 2012 for corresponding Japanese Appln. No. 2007-306637.

* cited by examiner

*Primary Examiner* — Man Phan
*Assistant Examiner* — Nourali Mansoury
(74) *Attorney, Agent, or Firm* — K&L Gates LLP

(57) ABSTRACT

Network connection of a terminal such as a mobile apparatus can be implemented at a transmission speed higher than that by a radio LAN. A connection method between a terminal and a connection apparatus is configured by replacing a radio LAN with electromechanical coupling, and transmission between the terminal and the connection apparatus is carried out using a baseband as it is without up conversion into a radio frequency band. This eliminates a bottleneck by the throughput of the radio LAN and eliminates the problems of the cost and the power consumption which arise from up conversion of a transmission signal. Further, bridging of data can be carried out by simple code conversion, and since the apparatus configuration is simplified, the cost can be reduced.

10 Claims, 10 Drawing Sheets

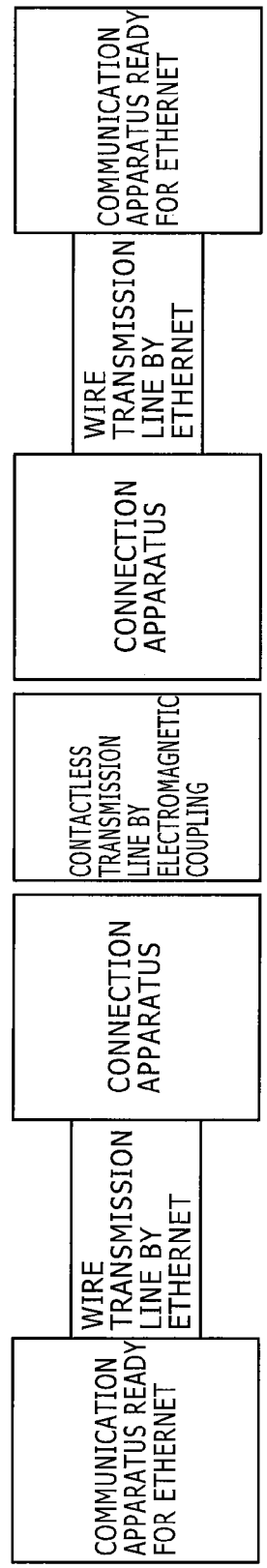
F I G . 5

FIG.9
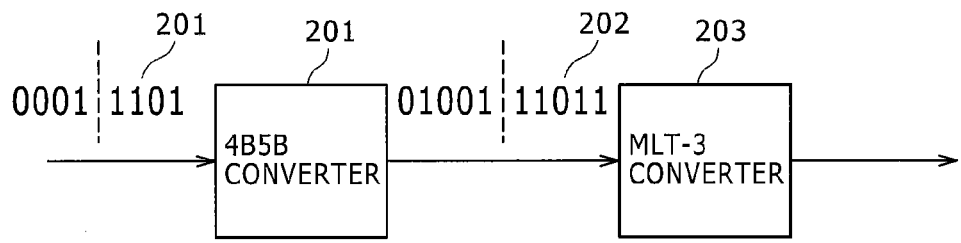
FIG.10
| ORIGINAL DATA | 4B5B |
|---|---|
| 0 0 0 0 | 1 1 1 1 0 |
| 0 0 0 1 | 0 1 0 0 1 |
| 0 0 1 0 | 1 0 1 0 0 |
| ⋮ | ⋮ |
| 1 1 0 1 | 1 1 0 1 1 |
| 1 1 1 0 | 1 1 1 0 0 |
| 1 1 1 1 | 1 1 1 0 1 |
FIG.11
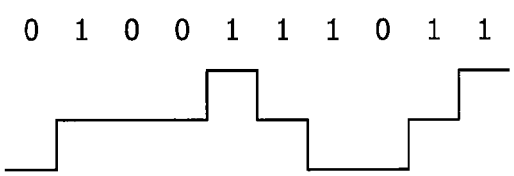

TRANSMISSION SYSTEM AND TRANSMISSION APPARATUS

CROSS REFERENCE TO RELATED APPLICATIONS

The present application is a National Stage of International Application No PCT/JP2008/068934 filed on Oct. 20, 2008, and which claims priority to Japanese Patent Application No. 2007-306637 filed on Nov. 27, 2007, the entire contents of which are being incorporated herein by reference.

BACKGROUND

The present disclosure relates to a transmission system and a transmission apparatus wherein a terminal such as a mobile apparatus is connected to a network without a cable, and particularly to a transmission system and a transmission apparatus wherein a mobile apparatus is connected to a wired network such as the Ethernet (registered trademark) through a connection apparatus such as an access point.

More particularly, the present disclosure relates to a transmission system and a transmission apparatus wherein a mobile apparatus is connected to a network at a transmission speed similar to that of the Ethernet (registered trademark), and particularly to a transmission system and a transmission apparatus wherein a mobile apparatus is connected to a network using short range communication means for communication at such a short distance as a contactless distance at a high speed with reduced power consumption and at a reduced cost.

The word "ubiquitous" is used frequently as a direction destined by a computer and a network in the future. "Ubiquitous" signifies an environment wherein, to anywhere the user moves, the user can utilize the capacity of computers individually having similar performances. For example, not only information equipments such as personal computers but also digital home electronics appliances, installation type AV equipments, digital still cameras and digital video cameras which are mobile apparatus, PDAs (Personal Digital Assistants) and portable telephone sets tend to be taken into the ubiquitous network. Under the ubiquitous environment, search for information and calculation are carried out by all of user's personal belongings and knowledge can be extracted easily.

In order to implement a ubiquitous environment, a great number of subjects are involved in hardware and software. First, as a hardware subject, a higher-speed and high-degree network is required in order to make it possible for various apparatus to immediately extract data necessary for the user.

The Ethernet (registered trademark) is known and widely utilized already as means for connecting various apparatus to each other into a network in a home or the like. The Ethernet (registered trademark) specifies layers corresponding to the physical layer and the data link layer which are two lower layers of the OSI reference model, and the 10Base-T having a 10-Mbps transmission speed, the 100Base-T having a 100-Mbps transmission speed and so forth are standardized. A standard group wherein a twist pair cable (twist pair cable) is used as a transmission medium from within the Fast Ethernet (registered trademark) standards is called 100Base-T and is standardized as IEEE 802.3u.

A principal LAN in the present age is configured from a combination of the Ethernet (registered trademark) which is physical standards and a TCP/IP protocol which specifies communication contents in a higher layer of the Ethernet (registered trademark). On the other hand, for mobile apparatus, it is popular to use a radio LAN in place of the Ethernet (registered trademark). This arises from reasons regarding the size of a connector of the Ethernet (registered trademark), convenience in use with cable connection and so forth. The radio LAN is standardized, for example, as IEEE 802.11. A terminal such as a mobile apparatus wherein the radio LAN is built in is mutually connected to the wire Ethernet (registered trademark) by bridging by means of a connection apparatus which is also called access point.

For example, some proposals have been made regarding a home network system to which an access point is connected through a server and the Internet and which is configured by connecting to a home terminal through a radio LAN (for example, refer to Patent Document 1).

FIG. 8 schematically shows a radio LAN incorporated in a terminal and a protocol stack in a connection apparatus which bridges a radio LAN and a wire LAN.

In FIG. 8, reference numeral 100 denotes a protocol stack on the mobile terminal side, and a PHY layer 102 defined by the IEEE 802.11 and a MAC (Machine Access Control) layer 103 are used as two lower layers. A plurality of standards such as a, b, g, and n exist in the IEEE 802.11 depending upon the difference in the used frequency band, modulation method and transmission speed and so forth. The higher layer 103 of the IEEE 802.11 MAC is configured from an LLC (Logical Link Control) layer, an IP (Internet Protocol) layer and a TCP (Transmission Control Protocol) layer, and an application layer 105 is provided as a higher layer than the layers just described.

Further, in FIG. 8, reference numeral 101 denotes a protocol stack of a connection apparatus corresponding to an access point or the like. A PHY layer 106, a MAC layer 107 and an upper layer 108 which are opposed to and communicate with the PHY layer 102 and MAC layer 103 on the terminal side are provided on the left side of the stack, that is, on the radio LAN side. A packet communicated by the radio LAN is bridged to a protocol stack of the wire Ethernet (registered trademark) on the right side through the PHY layer 106, MAC layer 107 and higher layer 108 by a bridge 109. Further, an upper layer 110, a MAC layer 111 defined by the IEEE 802.3 and a PHY layer 112 are provided on the right side of the stack, that is, on the Ethernet (registered trademark) side, and communication is carried out with an apparatus connected to the Ethernet (registered trademark) ahead the access point. With the protocol stack shown in FIG. 8, mutual connection between a mobile terminal and an equipment ready for the Ethernet (registered trademark) is implemented.

In this manner, by using the radio LAN, the mobile apparatus can be connected to a network. However, the transmission speed when wire communication is carried out through an access point depends upon the radio LAN standards, and approximately 20 Mbps to the utmost in throughput is a limit. Further, protocol conversion need be carried out between the IEEE 802.11 and the Ethernet (registered trademark) at an access point connected to a mobile apparatus, and the cost is required not only for protocol conversion but also for up-conversion of a transmission signal into a signal of a radio frequency band when transfer to the mobile apparatus is to be carried out.

Therefore, it is considered that, if an application wherein the transmission system shown in FIG. 8 is applied to reproduction of a digital video camera ready for the high definition television system, then the transmission speed when data is transmitted from the digital video camera to a connection apparatus by a radio LAN or protocol conversion carried out by the connection apparatus becomes a bottleneck, and a sufficient throughput cannot be obtained. Further, the radio LAN has a problem in that the power consumption is high and also the cost is high.

Although radio communication by a radio LAN or the like is utilized widely also in an ordinary household, different from mobile communication, such opportunities that image data is sent by radio while a digital still camera or a digital video camera is being moved are few. The inventors consider that, although many mobile apparatus are sufficient if they can carry out communication at such a short distance as a contactless distance although cable connection is not desirable, a transmission speed similar to that of the Ethernet (registered trademark) is demanded rather.

Patent Document 1: Japanese Patent Laid-Open No. 2002-162149

It is desired to provide a superior transmission system and a superior transmission apparatus by which a mobile apparatus can be connected suitably to a wired network such as the Ethernet (registered trademark) through a connection apparatus such as an access point.

It is also desired to provide a superior transmission system and a superior transmission apparatus by which a mobile apparatus can be connected to a network at a transmission speed similar to that of the Ethernet (registered trademark).

It is also desired to provide a superior transmission system and a superior transmission apparatus by which a mobile apparatus can be connected at a high speed, with low power consumption and at a low cost to a network using short distance communication means for communication at such a short distance as a contactless distance.

SUMMARY

According to a first embodiment, there is provided a transmission system for carrying out data transmission with a communication apparatus which can be connected by a predetermined wire transmission method, including:

a terminal apparatus including a MAC layer of the predetermined wire transmission method for carrying out mutual transmission with the communication apparatus;

a connection apparatus connected to the communication apparatus by a physical layer of the predetermined wire transmission method; and contactless transmission means adapted to connect the terminal apparatus and the connection apparatus to each other by electromagnetic coupling.

It is to be noted that the "system" as referred to herein is a logical aggregate of a plurality of apparatus (or functioning modules which implement a predetermined function) and it does not particularly matter whether or not the apparatus or functioning modules are included in a single housing.

When various apparatus such as digital home electronic appliances, installation type AV apparatus and mobile apparatus are to be network connected, one of technical subjects in regard to hardware is a method of connecting a terminal whose connection by means of a cable is not desirable such as a mobile apparatus to a network.

Conventionally, it is popular to incorporate a radio LAN in a mobile apparatus and implement connection of the mobile apparatus to a network such as an Ethernet (registered trademark) via a connection apparatus such as a radio LAN access point. However, there is a problem that the throughput of the radio LAN or protocol conversion carried out at the access point becomes a bottleneck or there is a problem of the power consumption, cost and so forth of the radio LAN.

On the other hand, it is satisfactory if many mobile apparatus can carry out communication at such a short distance as a contactless distance although cable connection is not desirable. In particular, the transmission system according to the present embodiment is configured such that a connection method between a terminal such as a mobile apparatus and a connection apparatus such as an access point is changed from a radio LAN to electromagnetic coupling and a baseband is used as it is for communication between the terminal and the connection apparatus without up converting a transmission signal into that of a radio frequency band.

This eliminates the bottleneck by the throughput of a radio LAN and eliminates the problem regarding the cost and the power consumption arising from up conversion of a transmission signal. Further, bridging of data from the electromagnetic coupling to the Ethernet (registered trademark) can be established by simple code conversion (or in other words, the necessity for protocol conversion is eliminated) and the apparatus configuration is simplified in comparison with a radio LAN module. Therefore, the design and fabrication cost can be reduced significantly.

In the transmission system according to the present embodiment, a mobile terminal which carries out mutual transmission with a communication apparatus ready for the Ethernet (registered trademark) includes the MAC layer of the Ethernet (registered trademark), and the connection apparatus is a communication apparatus of the Ethernet (registered trademark) in the physical layer of the Ethernet (registered trademark). Further, contactless transmission means of the terminal apparatus and the connection apparatus are connected to each other by electromechanical coupling.

Accordingly, since, between the mobile terminal and the connection apparatus, the contactless transmission means carry out transmission by the electromagnetic coupling using the baseband as it is, the transmission can be implemented at a higher transmission speed than that by a radio LAN, and a throughput of, for example, approximately 90 Mbps can be achieved.

Here, the contactless connection means for connecting the mobile terminal and the connection apparatus includes a first physical layer which functions as a physical layer of the Ethernet (registered trademark) for the MAC layer of the Ethernet (registered trademark) of the mobile terminal, and a second physical layer which functions as the MAC layer of the Ethernet (registered trademark) for the physical layer of the Ethernet (registered trademark) in the connection apparatus. Accordingly, the mobile terminal can use the MAC layer of the Ethernet (registered trademark) as it is to carry out transmission mutually with the communication apparatus ready for the Ethernet (registered trademark).

In the 100 Base-T of the Ethernet (registered trademark), the 4B5B and MLT-3 encoding system is used to decrease, although a rising edge and a falling edge are moderate, frequency components so that a signal can be sent farther. In contrast, where data transmission by electromagnetic coupling is carried out, it is not preferable for a transmission signal to include a direct current component. Therefore, the first physical layer on the mobile terminal side and the second physical layer on the connection apparatus side use not the 4B5B and MLT-3 encoding method but the Manchester encoding method to carry out code conversion of transmission data of the baseband to be transferred between the MAC layer and the physical layer of the Ethernet (registered trademark) thereby to carry out data transmission by the electromagnetic coupling. Although the Manchester code does not have a direct current component, the spectrum expands to a wide band. If data of 100 Mbps are Manchester encoded, then a peak of the spectrum appears at approximately 90 MHz. Since the band necessary for transmission is sufficient where it is less than 200 MHz, the data can be handled as feeble radio waves of lower than 322 MHz. In the Ethernet (registered trademark), the 4B5B and MLT-3 encoding system is used to moderate a rising edge and a falling edge and decrease frequency components in comparison with those of the Manchester code so that a signal can be sent farther. In contrast, in the communication of the electromagnetic coupling system which is carried out between the first and second physical layers, since this is short distance communication, the spread of the frequency does not matter, and rather, importance is attached to removal of a direct current component to apply the Manchester encoding system.

Meanwhile, according to a second embodiment, there is provided a transmission system for carrying out data transmission between two or more communication apparatus which can be connected by a predetermined wire transmission method, including a contactless transmission line connected, within a partial interval of a wire transmission line according to the predetermined wire transmission method, to the communication apparatus by a physical layer of the predetermined wire transmission method and configured from a pair of connection apparatus connected to each other by electromagnetic coupling.

In the transmission system according to the first embodiment, a mobile apparatus having contactless transmission means by electromagnetic coupling as the physical layer or transmission medium and a communication apparatus ready for the Ethernet (registered trademark) are bridged by a connection apparatus. In contrast, the transmission system according to the second embodiment is characterized in that a contactless (that is, by electromagnetic coupling) transmission line is provided using a pair of opposing connection apparatus within a partial interval of a transmission line which connects two communication apparatus ready for the Ethernet (registered trademark) to each other.

By providing the contactless transmission line within the partial interval of the wire transmission line of the Ethernet (registered trademark) or the like in this manner, two wire transmission lines (individual LAN segments and so forth) can be connected to each other readily across a boundary across which a cable cannot be extended such as, for example, a wall between rooms or a window. Further, each of the communication apparatus ready for the Ethernet (registered trademark) can carry out a data transmission operation in accordance with a prescribed protocol without perceiving at all that some interval of a network of the Ethernet (registered trademark) is formed as a contactless transmission line by electromagnetic coupling.

According to embodiments, a superior transmission system and a superior transmission apparatus can be provided by which a mobile apparatus can be connected suitably to a wired network such as the Ethernet (registered trademark) through a connection apparatus such as an access point.

Further, a superior transmission system and a superior transmission apparatus can be provided by which a mobile apparatus can be connected to a network at a transmission speed similar to that of the Ethernet (registered trademark).

Furthermore, a superior transmission system and a superior transmission apparatus can be provided by which a mobile apparatus can be connected at a high speed, with low power consumption and at a low cost to a network using short distance communication means for communication at such a short distance as a contactless distance.

With the transmission system according to the embodiments, network connection of a terminal such as a mobile apparatus can be implemented at a transmission speed higher than that by a radio LAN, and a throughput of, for example, approximately 90 Mbps can be achieved. Accordingly, the transmission system can be applied also to reproduction on the Ethernet (registered trademark) of a digital video camera ready for a high definition television system.

Further, in the transmission system according to the embodiments, since the terminal and the connection apparatus carry out transmission there between using the baseband without up conversion to such a high radio frequency band as 2.4 GHz or 5 GHz, operation of the terminal side is carried out with reduced power consumption and besides miniaturization and reduction in cost of the apparatus can be implemented.

Further, since an existing communication protocol can be used in the MAC layer and a higher layer, it is easy to maintain compatibility with an existing system.

Additional features and advantages are described herein, and will be apparent from, the following Detailed Description and the figures.

BRIEF DESCRIPTION OF THE FIGURES

FIG. 5 is a view showing a modification to the transmission system according to the embodiment.

FIG. 9 is a view illustrating a transmission code of the 100 Base-T which adopts the 4B5B and MLT-3 encoding system.

FIG. 10 is a view illustrating a conversion rule of the 4B5B code.

FIG. 11 is a view illustrating data outputted from an MLT-3 converter 203.

EXPLANATION OF REFERENCE SYMBOLS

Figure 1:
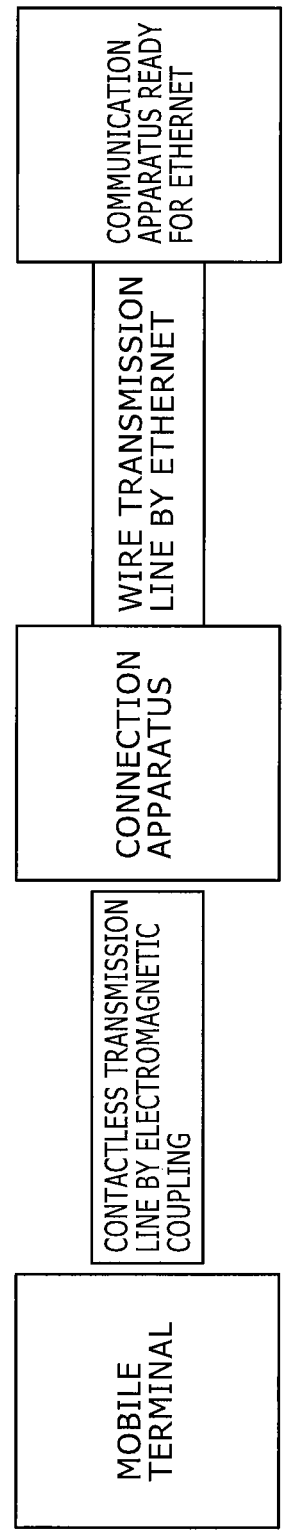
FIG. 1 is a view schematically showing a transmission system according to an embodiment.

201 . . . 4B5B converter, 203 . . . MLT-3 converter, 300 . . . protocol stack on the mobile terminal side, 301 . . . new physical layer, 302 . . . IEEE 802.3 MAC layer, 303 . . . upper layer, 304 . . . application layer, 310 . . . protocol stack of the connection apparatus, 311 . . . new physical layer, 312 . . . IEEE 802.3 PHY layer, 313 . . . bridge, 400 . . . digital video camera, 401 ... connection apparatus, 402, 403 ... coil for electromagnetic coupling, 404 ... communication apparatus, 500 ... terminal, 501 ... coil for electromagnetic coupling, 502 ... coupler, 503 ... code conversion A section, 504 ... clock extraction section, 505 ... MII, 506 .... Ether MAC section, 507 ... application section, 510 ... connection apparatus, 511 ... coil for electromagnetic coupling, 512 ... coupler, 513 ... code conversion B section, 514 ... clock extraction section, 515. MII, 516 .... Ether. PHY section, 517 ... connector of the RJ-45.

DETAILED DESCRIPTION

In the following, an embodiment is described with reference to the drawings.

The embodiment relates to a transmission system wherein a mobile apparatus is connected to a wired network such as the Ethernet (registered trademark) through a connection apparatus such as an access point.

Conventionally, it is popular to incorporate a radio LAN in a mobile apparatus and implement connection of the mobile apparatus to a network such as an Ethernet (registered trademark) via a connection apparatus such as a radio LAN access point. However, there is a problem that the throughput of the radio LAN or protocol conversion carried out at the access point becomes a bottleneck or is a problem of the power consumption, cost and so forth of the radio LAN.

On the other hand, it is satisfactory if many mobile apparatus can carry out communication at such a short distance as a non-contacting distance although cable connection is not desirable. In particular, the transmission system according to the embodiment is configured such that a connection method between a terminal such as a mobile apparatus and a connection apparatus such as an access point is changed from a radio LAN to electromagnetic coupling and a baseband is used as it is for communication between the terminal and the connection apparatus without up converting a transmission signal into that of a radio frequency band (refer to FIG. 1).

This eliminates the bottleneck by the throughput of a radio LAN and eliminates the problem regarding the cost and the power consumption arising from up conversion of a transmission signal. Further, bridging of data from the electromagnetic coupling to the Ethernet (registered trademark) can be established by simple code conversion (or in other words, the necessity for protocol conversion is eliminated) and the apparatus configuration is simplified in comparison with a radio LAN module. Therefore, the design and fabrication cost can be reduced significantly.

The principal object of code conversion carried out upon contactless transmission by electromagnetic coupling resides in removal of a DC component included in transmission data of a baseband. First, a coding method of the Ethernet (registered trademark) is described.

Since successive appearances of "0" on a transmission signal make it difficult to establish synchronism, it is essentially necessary to remove a DC component. In the 10BASE-T of 10 Mbps, in order to eliminate a DC component from a transmission signal, the Manchester encoding system is adopted. According to the Manchester code, when a binary value "0" is to be sent, the signal level is changed from the high level to the low level at the center of a bit interval, but when the other binary value "1" is to be sent, the signal level is changed reversely from the low level to the high level at the center of a bit interval. In other words, the Manchester code expands the frequency band to twice to eliminate a DC component of the transmission signal. Meanwhile, in the 100Base-T of a transmission rate of 100 Mbps, the 4B5B and MLT-3 encoding system is used to moderate a rising edge and a falling edge and decrease frequency components in comparison with those of the Manchester code so that a signal can be sent farther. Here, the 4B5B is an encoding system which eliminates successive appearances of 0 by representing an original string of 4 bits in 5 bits, and the MLT-3 is an encoding system wherein a signal is determined in a state of three values (0 corresponds to no change and one corresponds to increase or decrease by one step). According to the latter MLT-3 encoding system, the variation in waveform can be reduced and the spread of the spectrum can be suppressed.

FIG. 9 illustrates a transmission code of the 100Base-T which adopts the 4B5B and MLT-3 encoding system.

Where data to be transmitted is "00011101" as denoted by reference numeral 200, a 4B5B converter 201 first carries out 4B5B code conversion to covert data into data of 5 bits for each 4 bits. If many "0s" appear successively, then since it becomes impossible to establish synchronism, the 4B5B conversion inserts at least two 1s. A transmission rule is given in a table shown in FIG. 10. Since the transmission data denoted by reference numeral 200 is "00011101," the data after the 4B5B conversion is "0100111011" as denoted by reference numeral 202. According to the 4B5B code conversion, successive appearances of "0" can be prevented.

Thereafter, an MLT-3 converter 203 converts the data into a three-value NRZI (Non Return to Zero Invert: the polarity is inverted every time the bit value 1 of a modulation code appears) code. The MLT-3 converter 203 uses a rule that "0" corresponds to no change and 1 corresponds to increase or decrease by one step to carry out the conversion (described hereinabove). The converted data is represented as such a signal as illustrated in FIG. 11. According to the MLT-3 code conversion, the variation in waveform can be reduced and the spread of the spectrum can be suppressed.

Figure 12:
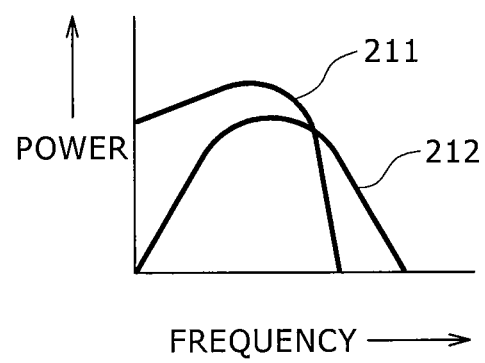
FIG. 12 is a view illustrating a power spectrum of a code of the 4B5B+MLT-3 used in the 100 Base-T and a Manchester code used in the 10 Base-T.

FIG. 12 illustrates a power spectrum of the 4B5B and MLT-3 code used in the 100Base-T and the Manchester code used in the 10Base-T. In FIG. 12, a reference numeral 211 denotes the spectrum by the 4B5B and MLT-3 code and another reference numeral 212 denotes the spectrum by the Manchester code. If they are compared with each other, then it can be recognized that, although the 4B5B and MLT-3 code includes a high component in the proximity of the direct current, the amount of the spectrum of high frequency components is small and the degree of concentration is high. Meanwhile, although the Manchester code has no direct current component, the spectrum expands to a wide band. Since, in the Manchester code, the bit value "0" is represented as "10" and the bit value "1" is represented as "01," a doubled clock rate is required in comparison with an alternative case wherein a data string is transmitted as it is.

In order to transmit a 100Base-T code using a cable, the 4B5B and MLT-3 code is preferably used. On the other hand, in the transmission system of the present invention, since contactless communication by an electromagnetic coupling system is used for connection between a terminal such as a mobile apparatus and a connection apparatus such as an access point, it is not preferable that the transmission signal includes a direct current component.

Therefore, it is tried to convert, in data transmission by electromagnetic coupling between a terminal and a connection apparatus, a 4B5B and MLT-3 code into a Manchester code although the spectrum expands. If data of 100 Mbps are Manchester-encoded, then a peak of the spectrum appears at approximately 90 MHz. Since the frequency band necessary for transmission may be lower than 200 MHz, it is possible to handle the data as feeble radio waves lower than 322 MHz. In the Ethernet (registered trademark), the 4B5B and MLT-3 encoding system is used to moderate a rising edge and a falling edge of the radio wave in comparison with those of the Manchester code and decrease the frequency components so that the signal is sent farther. In contrast, in communication of the electromagnetic coupling system, since this is communication to a very short distance, the spread of the frequency does not matter, but the Manchester encoding system is applied attaching importance rather to removal of a direct current component.

Figure 2:
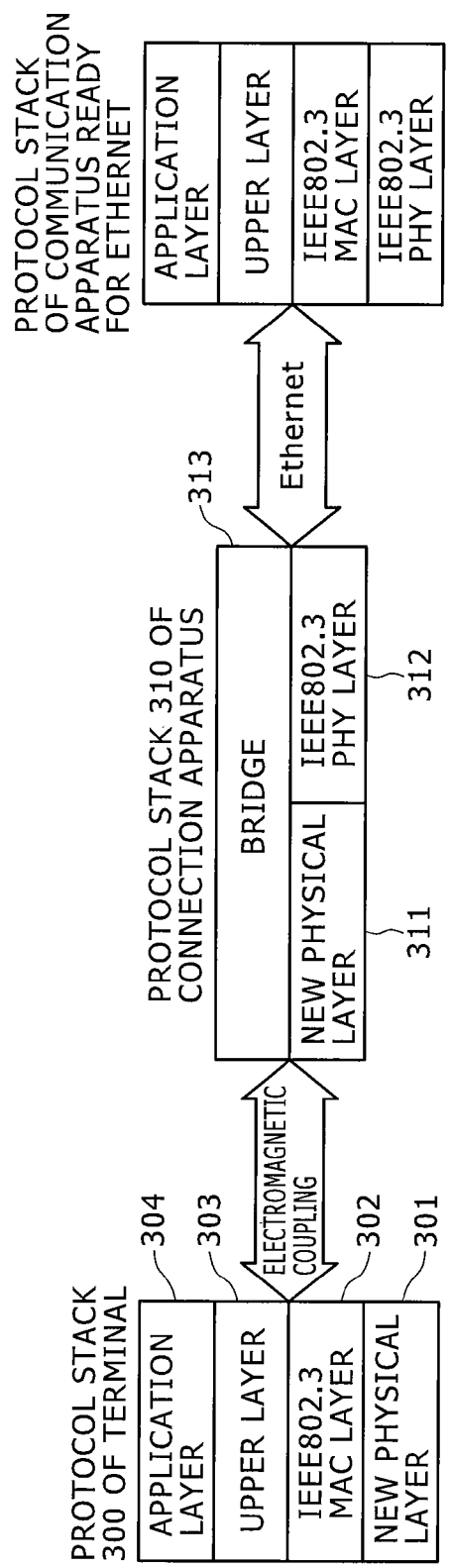
FIG. 2 is a view schematically showing a protocol stack for allowing a connection apparatus to connect a terminal which incorporates a contactless communication function by an electromagnetic coupling system to a network of the Ethernet (registered trademark) in the embodiment.

FIG. 2 schematically shows a protocol stack for allowing a connection apparatus to establish a connection of a terminal which incorporates a contactless communication function by an electromagnetic coupling system to a network of the Ethernet (registered trademark) in embodiment.

Figure 8:
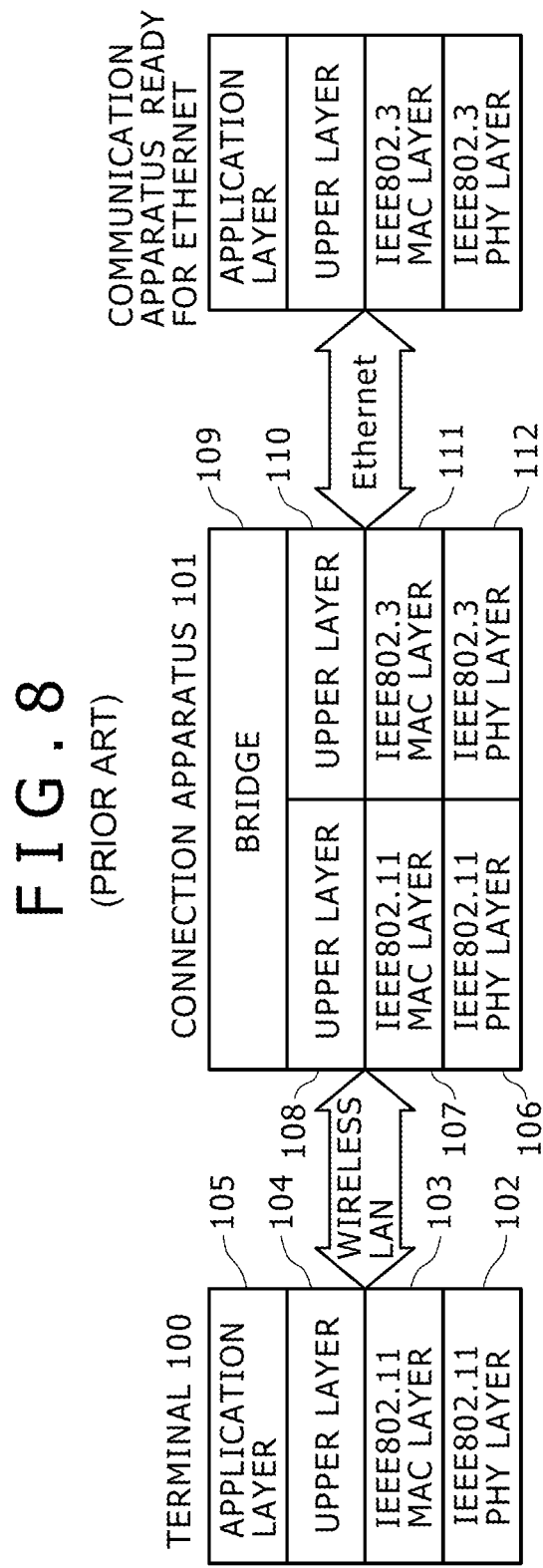
FIG. 8 is a view schematically showing a radio LAN incorporated in a terminal and a protocol stack in a connection apparatus which bridges the radio LAN and a wire LAN.

The physical layer of the protocol stack 300 on the mobile terminal side is a new physical layer 301 which adopts the Manchester code as an encoding system and uses an electromagnetic coupling system as a medium. The protocol stack 300 further includes a MAC layer 302 according to the IEEE 802.3, an upper layer 303 and an application layer 304. The upper layer 303 and the application layer 304 are same as those of a protocol stack where a radio LAN of FIG. 8 is used. The protocol stack 300 of the terminal may be regarded as a protocol stack wherein the PHY layer of the IEEE 802.3, which is the lowermost layer of the protocol stack of the host on the Ethernet (registered trademark), is replaced by the new physical layer 301.

Meanwhile, the protocol stack 310 of the connection apparatus includes a new physical layer 311, a PHY layer 312 of the IEEE 802.3, and a bridge 313. The new physical layer 311 adopts the Manchester code as an encoding system and uses an electromagnetic coupling system as a medium, and the terminal and the connection apparatus are connected to each other by electromagnetic coupling. Meanwhile, the code conversion section 303 carries out mutual conversion between the 4B5B and MLT-3 code of the IEEE 802.3, that is, of the 100Base-T, and the Manchester code. The protocol stack 301 of the connection apparatus can be regarded merely as a protocol stack which is configured only from a module which implements protocol conversion between the PHY layer of the IEEE 802.3 and the new physical layer. If the protocol stack 310 is compared with that of the connection apparatus shown in FIG. 8, then it can be recognized that it has a simple and convenient configuration.

When the application layer 304 of the terminal carries out data transmission destined for a communication apparatus on an Ethernet (registered trademark) network, the new physical layer 301 Manchester encodes a data string of a baseband which forms transmission MAC frames of the IEEE 802.3 and transmits resulting codes by the electromagnetic coupling system.

The new physical layer 311 of the connection apparatus receives a data string formed from Manchester codes by the electromagnetic coupling system. Then, the bridge 313 decodes the received data string into original transmission data of the baseband. Then, the PHY layer 312 of the IEEE 802.3 encodes the transmission data of the baseband into 4B5B and MLT-3 codes and transfers the 4B5B and MLT-3 codes to a communication apparatus ready for the Ethernet (registered trademark) as a destination through the 100Base-T transmission line of the Ethernet (registered trademark).

Further, when transmission data encoded into 4B5B and MLT-3 codes are sent from a communication apparatus ready for the Ethernet (registered trademark) through the 100Base-T transmission line of the Ethernet (registered trademark) so as to be destined for the application layer 304, the PHY layer 312 of the IEEE 802.3 of the communication apparatus receives the transmission data and carries out baseband processing for the transmission data and then passes the processed transmission data to the bridge 313. The bridge 313 Manchester encodes the transmission data of the baseband, and the new physical layer 311 transmits the Manchester codes by the electromagnetic coupling system. Therefore, the new physical layer 302 of the terminal can receive a data string formed from Manchester codes by the electromagnetic coupling system.

Between the mobile terminal and the connection apparatus, data are transmitted making use of the electromagnetic coupling using the baseband as it is without up converting the data into data of a radio frequency band. The principal object of the code conversion which is carried out upon contactless transmission by the electromagnetic coupling resides in removal of a DC component included in the transmission data of the baseband, and only it is necessary to carry out simple code conversion while complicated protocol conversion is not required. Further, it should be understood sufficiently that the mobile apparatus uses the MAC layer of the Ethernet (registered trademark) as it is to carry out mutual transmission to and from a communication apparatus ready for the Ethernet (registered trademark).

Figure 3:
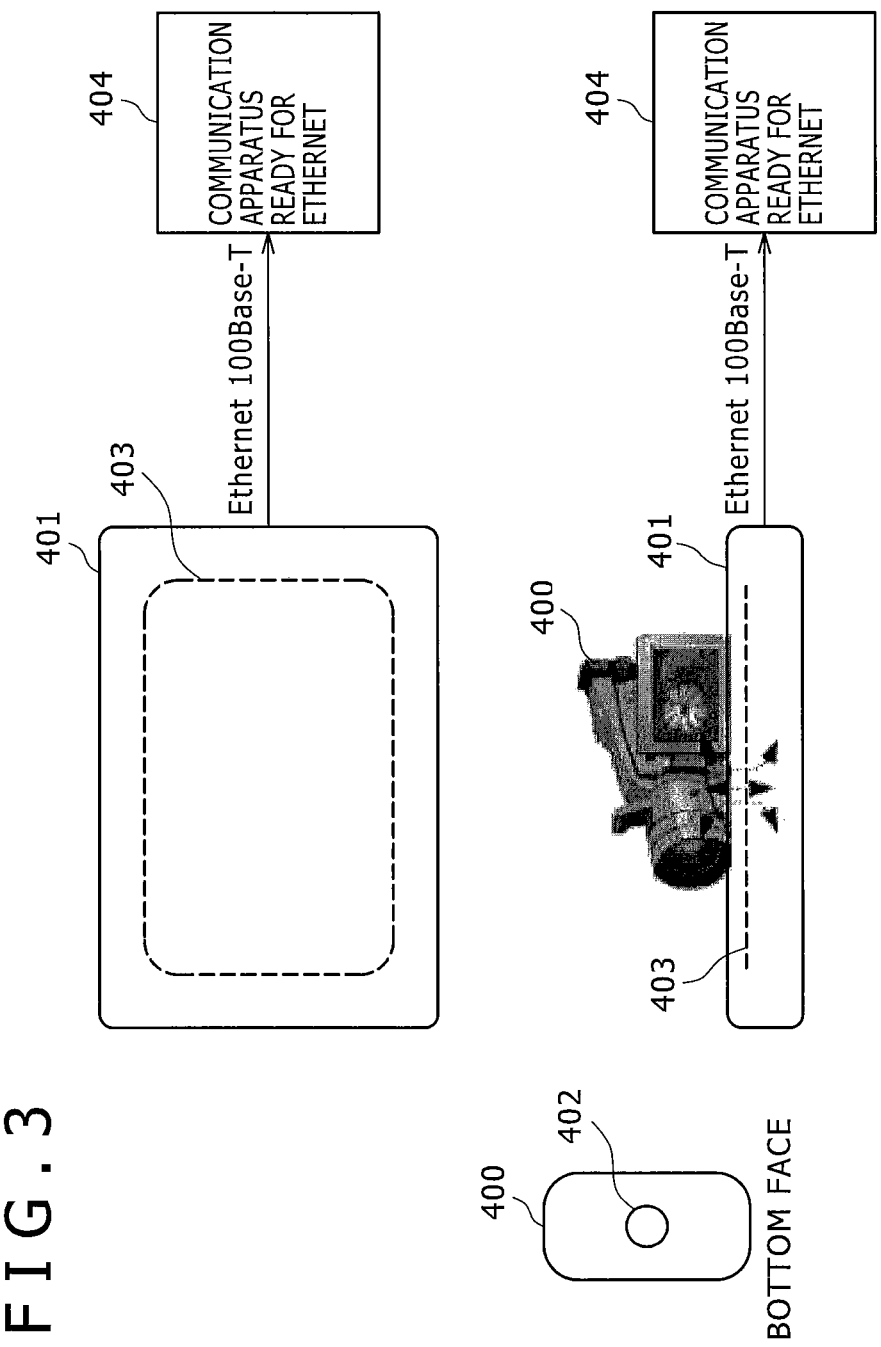
FIG. 3 is a view schematically showing an example of a configuration of the transmission system wherein the embodiment is applied to connect a digital video camera 400 and a communication apparatus which incorporates the Ethernet (registered trademark) are connected to each other by a network.

FIG. 3 schematically shows an example of a configuration of a transmission system wherein the present invention is applied to connect the digital video camera 400 and a communication apparatus which incorporates the Ethernet (registered trademark) to each other by a network.

The digital video camera 400 corresponds to the mobile apparatus in FIG. 1 and includes a protocol stack (described hereinabove) which is formed from, as shown in FIG. 2, an application layer 304, an upper layer 303, a MAC layer 302 of the IEEE 802.3, and a new physical layer 301, and a coil 402 for electromagnetic coupling is mounted in the proximity of a bottom face of a body.

Meanwhile, the connection apparatus 401 corresponds to the connection apparatus in FIG. 1 and includes a protocol stack (described hereinabove) which is formed from, as shown in FIG. 2, a new physical layer 311, a bridge 313, and a PHY layer 12 of the IEEE 802.3, and a coil 403 for electromagnetic coupling is mounted in the proximity of an upper face of a body. Further, the PHY layer 312 of the IEEE 802.3 of the connection apparatus 401 is connected to a communication apparatus 404, which becomes an opposite party of communication of the digital video camera 400, through the 100Base-T of the Ethernet (registered trademark).

As shown at a lower portion of FIG. 3, if the digital video camera 400 is mounted on the connection apparatus 401, then the coils 402 and 403 for electromagnetic coupling of them are opposed to each other to establish a state wherein data transmission can be carried out by an electromagnetic coupling action. Further, since, between the new physical layers 301 and 311, the Manchester encoding system wherein a direct current component is removed from transmission data of the baseband is applied, contactless communication by electromagnetic coupling can be carried out suitably. If data of 100 Mbps is Manchester encoded, then a peak of a spectrum appears at approximately 90 MHz. Since the band necessary for transmission is sufficient where it is less than 200 MHz, the data can be handled as feeble radio waves of lower than 322 MHz. Since the communication of the electromagnetic coupling system is short distance communication, the spread of the frequency does not matter, importance is attached to removal of a direct current component to apply not the 4B5B and MLT-3 encoding system but the Manchester encoding system.

As shown in FIG. 3, the digital video camera 400 can establish a connection to the external communication apparatus 404 through the connection apparatus 401. Or it is possible to connect the digital video camera 400 directly to the Internet through a router or a modem.

Figure 4:
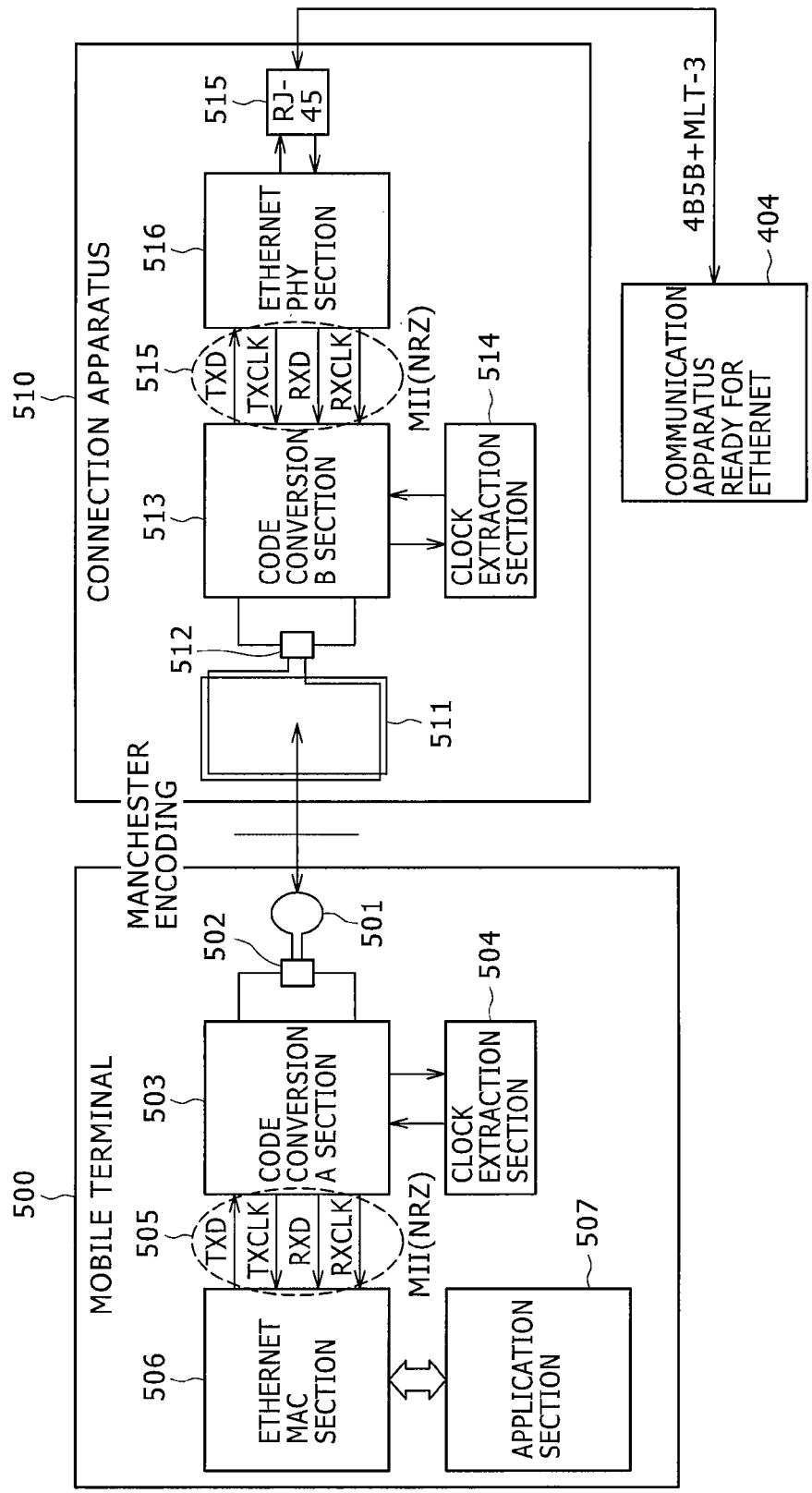
FIG. 4 is a view showing a configuration of a terminal 500 and a connection apparatus 501 which configures the transmission system according to the embodiment.

FIG. 4 shows an internal configuration of the terminal 500 and a connection apparatus 510 which configure the transmission system according to the embodiment.

While the terminal 500 corresponds to a digital video camera or some other mobile apparatus, it includes a coil 501 for electromagnetic coupling, a coupler 501, a code conversion A section 503, a clock extraction section 504, an Ether MAC section 506, and an application section 507. The coil 501 for electromagnetic coupling, the coupler 502, the code conversion A section 503 and clock extraction section 504 correspond to the new physical layer 302 in FIG. 2.

The code conversion A section 503 acts as a pseudo Ether PHY section for the Ether MAC section 506. In particular, the code conversion A section 503 is connected to the Ether MAC section 506 by a MII 505 (Media Independent Interface) and Manchester encodes NRZ (Non Return to Zero) data from and to the MII. Principal signals of the MII 505 are transmission data (TXD), a transmission clock (TX CLK), reception data (RXD), and a reception clock (RK CLK). The MII is originally used for connection between the MAC layer and the PHY layer of the Ethernet (registered trademark) (in FIGS. 2, 8 and so forth, in order to prevent complication of the drawings, the MII 505 is omitted for the convenience of illustration).

Transmission data from the application section 507 are passed to the Ether MAC section 506, by which packetization of the Ethernet (registered trademark) is carried out. Then, the code conversion A section 503 Manchester encodes the NRZ data which form the transmission packet to remove a direct current component. The Manchester encoded data are sent to the coil 501 for electromagnetic coupling through the coupler 502.

Meanwhile, since data of Manchester codes transmitted through an electromagnetic coupling coil 511 on the connection apparatus 510 side do not include a direct current component, at a very short distance, they are received suitably by the coil 501 for electromagnetic coupling of the terminal 500. Then, the reception data enter the code conversion A section 503 and are converted from the Manchester codes into original NRZ data through the coupler 502 for electromagnetic coupling. Thereupon, the clock extraction section 504 extracts a clock from the Manchester codes and generates a reception clock (RX CLK). The Ether MAC section 506 carries out depacketization of the Ethernet (registered trademark) for the reception data sent from the code conversion A section 503 and passes the resulting user data to the application section 507.

The connection apparatus 510 corresponds to a bridge which carries out bridging of data between the terminal 500 and the communication apparatus 404 ready for the Ethernet (registered trademark) which is an opposite party of the communication of the terminal 500, and is configured from the coil 511 for electromagnetic coupling, a coupler 512, a code conversion B section 513, a clock extraction section 514, an Ether PHY section 516 and a connector section 517. Here, it should be understood that the coil 511 for electromagnetic coupling, coupler 512, code conversion A section 513 and clock extraction section 514 correspond to the new physical layer 311 in FIG. 2.

The code conversion B section 513 acts as a pseudo Ether MAC section for the Ether PHY section 516. In particular, the code conversion B section 513 is connected to the Ether PHY section 516 by a MII (Media Independent Interface) 515 and Manchester encodes NRZ (Non Return to Zero) data to and from the MII 515. Principal signals of the MII 515 are transmission data (TXD), a transmission clock (TX CLK), reception data (RXD) and a reception clock (RX CLK) similar to those described hereinabove (in FIGS. 2, 8 and so forth, in order to prevent complication of the drawings, the MII 515 is omitted for the convenience of illustration).

The Ether PHY section 516 is connected to the external communication apparatus 404 by a cable through the connector section 517 of the RJ-45, and baseband processes data in an encoded form by the 4B5B and MLT-3 encoding of the 100Base-T received from the communication apparatus 404 to convert the data into NRZ data. The NRZ converted data from the outside are Manchester encoded by the code conversion B section 513 and then sent to the coil 501 of the terminal 500 side by electromagnetic coupling of the coupler 512 and the coil 511. Since the Manchester code data do not include a direct current component, at a very short distance, they are received suitably by the coil 501 for electromagnetic coupling of the terminal 500. Processing by the terminal 500 side is such as described hereinabove.

On the other hand, if Manchester encoded data sent from the terminal 500 side by electromagnetic coupling are received by the coil 511, then they enter the code conversion B section 513 through the coupler 510 and are converted from the Manchester codes into original NRZ data. Thereupon, the clock extraction section 514 carries out clock reproduction to produce a reception clock (RCLK). The MII 515 is a MII same as that of the reference numeral 505 and connects the Ether PHY section 516 and the code conversion B section 513 to each other. On the connection apparatus 501 side, the code conversion B section 513 is connected to the Ether PHY section 516 by a MII and acts as a pseudo Ether MAC section for the Ether PHY section 516 (as described hereinabove). However, the MII of the reference numeral 505 and the MII of the reference numeral 515 are opposite in direction of data from the code conversion section.

As described above, according to the transmission system shown in FIGS. 1 to 3, since a contactless transmission line by electromagnetic coupling to which the Manchester code is applied is interposed between the physical layer and the MAC layer of the Ethernet (registered trademark), the physical layer and the MAC layer are placed into a state wherein they are physically separable from each other. Then, it becomes possible to implement data transmission at a speed equal to that of the Ethernet (registered trademark) between a terminal which includes a contactless interface by electromagnetic coupling and a communication apparatus which incorporates the Ethernet (registered trademark).

In the transmission system shown in FIG. 4, it is possible for the external communication apparatus 404 ready for the Ethernet (registered trademark) to consider the terminal 500 and the connection apparatus 510, which carries out data transmission to and from the terminal 500 by electromagnetic coupling, as one communication opposite party ready for the Ethernet (registered trademark) and carry out data transmission operation according to the ordinary Ethernet (registered trademark), that is, in conformity with the provisions of the IEEE 802.3. On the communication apparatus 404 side, while the terminal 500 which carries out contactless communication by electromagnetic coupling is an opposite party of communication, there is no necessity for the communication apparatus 404 to be conscious of the fact that a contactless transmission line by electromagnetic coupling is interposed.

Further, to the terminal 500, the ordinary Ether MAC section and the Ether Phy section connected to each other by the MII can be physically separated from each other through the code conversion A section 503 and the code conversion B section 513, and besides can carry out data transmission at a transmission speed equal to that of the Ethernet (registered trademark) by electromagnetic coupling. Or it is possible to say that the distance between the ordinary Ether MAC section and the Ether PHY section can be extended by the code conversion A section 503 and the code conversion B section 513. In any case, an upper layer than the Ether MAC section in the terminal 500 need not be conscious of the fact that a transmission line by electromagnetic coupling is interposed, and a data transmission operation in accordance with the ordinary Ethernet (registered trademark), that is, with the provisions of the IEEE 802.3, can be carried out.

FIG. 5 shows a modification to the transmission system according to the embodiment. In the transmission system shown in FIGS. 1 to 4, a mobile apparatus having contactless transmission means by electric coupling as a physical layer or a transmission medium and a communication apparatus ready for the Ethernet (registered trademark) are bridged by a connection apparatus. In contrast, the transmission system shown in FIG. 5 is characterized in that a contactless (that is, by electromagnetic coupling) transmission line is provided using a pair of opposing connection apparatus in some interval of a transmission line interconnecting two communication apparatus ready for the Ethernet (registered trademark). The configuration of a protocol stack incorporated in the connection apparatus and the internal configuration of the apparatus are similar to those shown in FIGS. 2 and 4, and therefore, description of them is omitted here.

By providing a contactless transmission line in some interval of a wire transmission line of the Ethernet (registered trademark) or the like in this manner, two wire transmission lines (individual LAN segments and so forth) can be connected to each other readily across a boundary across which a cable cannot be extended such as, for example, a wall between rooms or a window.

Further, where a connection is to be established through the connection apparatus described above, since transmission is carried out by electromagnetic coupling using a baseband as it is, such connection can be implemented with a transmission speed higher than that with a radio LAN, and there is a merit that a throughput of, for example, approximately 90 Mbps can be achieved.

Figure 6:
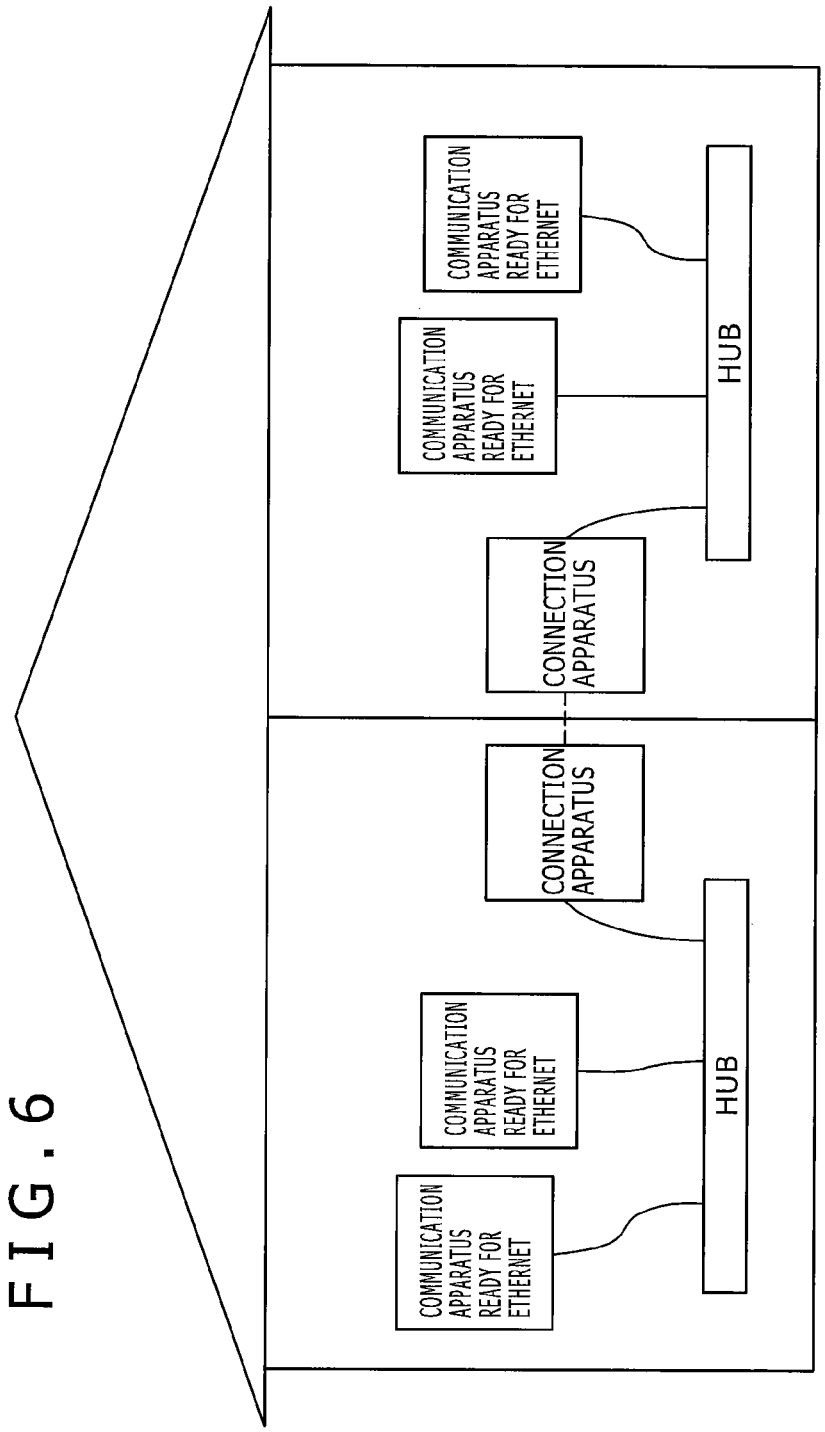
FIG. 6 is a view showing an example of a configuration of a transmission system to which a basic configuration shown in FIG. 5 is applied and which carries out communication between rooms.

FIG. 6 shows an example of a configuration of a transmission system to which the basic configuration of FIG. 5 is applied and by which communication between rooms is carried out. However, FIG. 6 is a sectional view of a house. In each of adjacent rooms, a plurality of communication apparatus ready for the Ethernet (registered trademark) are connected to each other through a hub. Further, also a connection apparatus is attached to the hub in each room. The electromagnetic coils of the pair of connection apparatus are disposed in an opposing relationship to each other across a wall between the rooms such that data transmission (bridging) by electromagnetic coupling is possible. Each of the communication apparatus ready for the Ethernet (registered trademark) can carry out a data transmission operation in accordance with a prescribed protocol without perceiving at all that some interval of a network of the Ethernet (registered trademark) is formed as a contactless transmission line by electromagnetic coupling.

Figure 7:
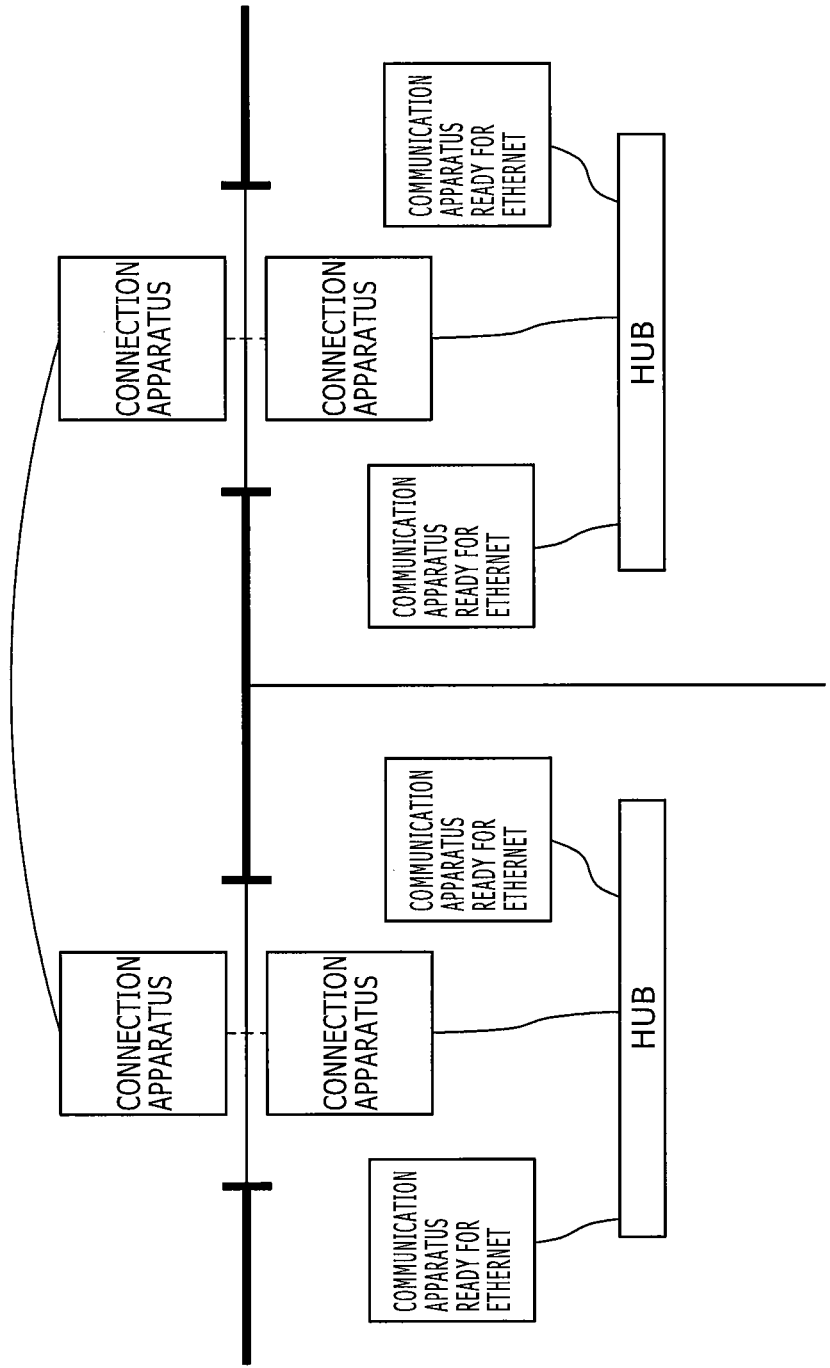
FIG. 7 is a view showing another example of a configuration of the transmission system to which the basic configuration shown in FIG. 5 is applied.

Meanwhile, FIG. 7 shows another example of a configuration of a transmission system to which the basic configuration shown in FIG. 5 is applied. However, FIG. 7 illustrates a manner wherein two adjacent rooms each having a window are overlooked. In FIG. 7, the electromagnetic coils of two connection apparatus are disposed in an opposing relationship to each other not between the rooms but across each window. The electromagnetic coils of the pair of connection apparatus are disposed in an opposing relationship to each other across the wall between the rooms, and data transmission (bridging) by electromagnetic coupling is possible. The connection apparatus in the inside of each room is attached to a hub, and a plurality of communication apparatus ready for the Ethernet (registered trademark) in the same room are connected to each other through the hub.

Meanwhile, the connection apparatus on the outdoor side is connected to the connection apparatus attached to the window of the other room similarly through a cable of the Ethernet (registered trademark). Then, also the outdoor connection apparatus of the other room is disposed such that the electromagnetic coil thereof is opposed to the electromagnetic coil of the indoor side connection apparatus, and data transmission (bridging) by electromagnetic coupling is possible. And, the indoor side connection apparatus is attached to a hub, and a plurality of communication apparatus ready for the Ethernet (registered trademark) in the same room are connected to each other through the hub.

The communication apparatus ready for the Ethernet (registered trademark) which are individually installed in the different rooms can carry out a data transmission operation in accordance with a prescribed protocol without perceiving at all the fact that some interval of the network of the Ethernet (registered trademark) is formed from a contactless transmission line by electromagnetic coupling.

In the transmission system shown in FIG. 7, mutual connection of the networks between the rooms is implemented through the windows. For example, also in such a building that electromagnetic coupling cannot be established across a wall, the transmission system is effective for mutual connection of LAN segments between the rooms.

It is to be noted that the connection apparatus installed outdoors are driven using a commercial AC power supply or an ordinary battery or otherwise using a solar cell. As a method of attaching the connection apparatus, a method which uses an attaching tool for exclusive use or a method which uses a bonding agent, a suction disk or the like is available.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A transmission system for carrying out data transmission with a communication apparatus which can be connected by a predetermined wire transmission method, the transmission system comprising:
   a terminal apparatus including a MAC layer of the predetermined wire transmission method for carrying out mutual transmission with the communication apparatus;
   a connection apparatus connected to the communication apparatus by a physical layer of the predetermined wire transmission method, the connection apparatus including a first physical layer which functions as a MAC layer of the predetermined wire transmission method for the physical layer of the predetermined wire transmission method; and contactless transmission means that connects said terminal apparatus and said connection apparatus to each other by electromagnetic coupling, wherein:

the first physical layer decodes a signal received by the electromagnetic coupling by a non-direct current encoding method which does not include a direct current component and transfers the decoded signal to the physical layer of the predetermined wire transmission method, said contactless transmission means carries out transmission using a baseband, said contactless transmission means includes a second physical layer which functions as a physical layer of the predetermined wire transmission method for the MAC layer of the predetermined wire transmission method in said terminal apparatus, the electromagnetic coupling is used for the data transmission carried out between the first and second physical layers the second physical layer encodes data of the baseband received from the MAC layer of the predetermined wire transmission method by the non-direct current encoding method and then transmits the encoded data by the electromagnetic coupling, and decodes a signal received by the electromagnetic coupling by the non-direct current encoding method and then transfers the decoded signal to the MAC layer of the predetermined wire transmission method, the first physical layer carries out encoding for data of the baseband received from the physical layer of the predetermined wire transmission method by the non-direct current encoding method and then transmits the encoded data by the electromagnetic coupling, the predetermined wire transmission method includes an Ethernet that includes a 4-byte/5-byte ("4B5B") and Multi-Level Transmit-3 ("MLT-3") encoding method, and the first and second physical layers code convert transmission data of the baseband into that of a Manchester encoding method and then transmits the converted data by the electromagnetic coupling, and code convert data received by the electromagnetic coupling from that of the Manchester encoding method into the transmission data of the baseband.

2. The transmission system according to claim 1, wherein it is prescribed in the predetermined wire transmission method that the MAC layer and the physical layer are connected to each other by a Media Independent Interface ("MII");

the first physical layer includes a coil and a coupler for the electromagnetic coupling and a first code conversion section connected to the MAC layer of the predetermined wire transmission method by the MII; and the first code conversion section code converts transmission data of the baseband received from the MAC layer of the predetermined wire transmission method into that of the non-direct current encoding method and then transmits the converted data from the coil and coupler for the electromagnetic coupling, and code converts data received by the coil and coupler for the electromagnetic coupling from that of the non-direct current encoding method into the transmission data of the baseband and then passes the converted data to the MAC layer of the predetermined wire transmission method through the MII.

3. The transmission system according to claim 1, wherein it is prescribed in the predetermined wire transmission method that the MAC layer and the physical layer are connected to each other by an MII;

the second physical layer includes a coil and a coupler for electromagnetic coupling, and a second code conversion section connected to the physical layer of the predetermined wire transmission method by the MII; and the second code conversion section code converts transmission data of the baseband received from the physical layer of the predetermined wire transmission method into that of the non-direct current encoding method and then transmits the converted data from the coil and coupler for the electromagnetic coupling, and code converts data received by the coil and coupler for the electromagnetic coupling from that of the non-direct current encoding method into the transmission data of the baseband and then passes the converted data to the physical layer of the predetermined wire transmission method through the MII.

4. The transmission system according to claim 1, wherein the connection apparatus includes a code conversion section that uses the non-direct current encoding method to decode the signal received by the electromagnetic coupling and transfers the decoded signal to the physical layer of the predetermined wire transmission method.

5. The transmission system according to claim 1, wherein the terminal apparatus includes a code conversion section that encodes the data of the baseband received from the MAC layer of the predetermined wire transmission method by the non-direct current encoding method and then transmits the encoded data by the electromagnetic coupling to the connection apparatus.

6. A transmission system for carrying out data transmission between two or more communication apparatus which can be connected by a predetermined wire transmission method, the transmission system comprising:

a contactless transmission line connected, within a partial interval of a wire transmission line according to the predetermined wire transmission method, to the communication apparatus by a physical layer of the predetermined wire transmission method and configured from a pair of connection apparatus connected to each other by electromagnetic coupling, the two or more communication apparatus including a first physical layer which functions as a MAC layer of the predetermined wire transmission method for the physical layer of the predetermined wire transmission method, wherein:

the first physical layer decodes a signal received by the electromagnetic coupling by a non-direct current encoding method which does not include a direct current component and transfers the decoded signal to the physical layer of the predetermined wire transmission method, transmission is carried out on the contactless transmission line connected with the paired connection apparatus using a baseband, each of the connection apparatus includes:

code conversion means for encoding data of a band of the predetermined wire transmission method by the non-direct current encoding method and for decoding data received by the electromagnetic coupling by the non-direct current encoding method and passing the decoded data to the physical layer of the predetermined wire transmission method, and a coil and a coupler for the electromagnetic coupling, the predetermined wire transmission method includes an Ethernet that includes an 4B5B and MLT-3 encoding method, and the code conversion means is connected to the physical layer of the predetermined wire transmission method by the MII, and code converts transmission data of a baseband into that of a Manchester encoding method and then transmits the converted data by the electromagnetic coupling and besides code converts data received by the electromagnetic coupling from that of the Manchester encoding method into the transmission data of the baseband.

7. A transmission apparatus for carrying out data transmission with a communication apparatus which can be connected by a predetermined wire transmission method, comprising:

a MAC layer of the predetermined wire transmission method; and a new physical layer which functions as a physical layer of the predetermined wire transmission method for said MAC layer of the predetermined wire transmission method and carries out data transmission by electromagnetic coupling, wherein:

the new physical layer decodes a signal received by the electromagnetic coupling by a non-direct current encoding method which does not include a direct current component and transfers the decoded signal to the MAC layer of the predetermined wire transmission method, said new physical layer carries out transmission by the electromagnetic coupling using a baseband, said new physical layer encodes data of a baseband received from said MAC layer of the predetermined wire transmission method by the non-direct current encoding method and then transmits the encoded data by the electromagnetic coupling, and decodes a signal received by the electromagnetic coupling into original transmission data of the baseband by the non-direct current encoding method and then passes the decoded data to the MAC layer of the predetermined wire transmission method, the predetermined wire transmission method includes an Ethernet that includes an 4B5B and MLT-3 encoding method, and said new physical layer code converts transmission data of the baseband passed from a MAC layer of the Ethernet into that of a Manchester encoding method and then transmits the converted data by the electromagnetic coupling, and decodes data received by the electromagnetic coupling from that of the Manchester encoding method into original transmission data of the baseband and then transfers the decoded data to the MAC layer of the Ethernet.

8. The transmission apparatus according to claim 7, wherein it is prescribed in the predetermined wire transmission method that the MAC layer and the physical layer are connected to each other by an MII;

the new physical layer includes a coil and a coupler for the electromagnetic coupling and a code conversion section connected to the MAC layer of the predetermined wire transmission method by the MII; and the code conversion section encodes data of the baseband received from said MAC layer of the predetermined wire transmission method by the non-direct current encoding method and then transmits the encoded data from the coil and coupler for electromagnetic coupling, and decodes data received by the coil and coupler for the electromagnetic coupling into the transmission data of the baseband by the non-direct current encoding method and then passes the decoded data to said MAC layer of the predetermined wire transmission method.

9. A transmission apparatus for carrying out bridging of data transmission by a predetermined wire transmission method, comprising:

a physical layer of the predetermined wire transmission method; and a new physical layer which functions as a MAC layer of the predetermined wire transmission method for said physical layer of the predetermined wire transmission method and carries out data transmission by electromagnetic coupling, wherein:

the new physical layer decodes a signal received by the electromagnetic coupling by a non-direct current encoding method which does not include a direct current component and transfers the decoded signal to the physical layer of the predetermined wire transmission method, said new physical layer carries out transmission by the electromagnetic coupling using a baseband, said new physical layer encode data of a baseband received from said physical layer of the predetermined wire transmission method by the non-direct current encoding method and then transmits the encoded data by the electromagnetic coupling, and decodes the signal received by the electromagnetic coupling into transmission data of the baseband by the non-direct current encoding method and then passes the transmission data to said physical layer of the predetermined wire transmission method, the predetermined wire transmission method includes an Ethernet that includes an 4B5B and MLT-3 encoding method, and said new physical layer code converts transmission data of the baseband passed from a physical layer of the Ethernet into that of a Manchester encoding method and then transmits the converted data by the electromagnetic coupling, and decodes data received by the electromagnetic coupling from that of the Manchester encoding method into the transmission data of the baseband and then passes the decoded data to said physical layer of the Ethernet.

10. The transmission apparatus according to claim 9, wherein it is prescribed in the predetermined wire transmission method that the MAC layer and the physical layer are connected to each other by an MIT;

said new physical layer includes a coil and a coupler for the electromagnetic coupling and a code conversion section connected to the physical layer of the predetermined wire transmission method by the MIT; and the code conversion section encodes data of the baseband received from said physical layer of the predetermined wire transmission method by the non-direct current encoding method and then transmits the encoded data from the coil and coupler for the electromagnetic coupling, and decodes data received by the coil and coupler for the electromagnetic coupling into the transmission data of the baseband by the non-direct current encoding method and then passes the decoded data to said physical layer of the predetermined wire transmission method.

* * * * *